United States Patent
Schmid

(10) Patent No.: US 12,263,714 B2
(45) Date of Patent: Apr. 1, 2025

(54) DEVICE FOR VENTILATING THE PASSENGER COMPARTMENT OF A MOTOR VEHICLE

(71) Applicant: Bayerische Motoren Werke Aktiengesellschaft, Munich (DE)

(72) Inventor: Bernhard Schmid, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 17/593,602

(22) PCT Filed: Mar. 13, 2020

(86) PCT No.: PCT/EP2020/056889
§ 371 (c)(1),
(2) Date: Sep. 21, 2021

(87) PCT Pub. No.: WO2020/200701
PCT Pub. Date: Oct. 8, 2020

(65) Prior Publication Data
US 2022/0153087 A1 May 19, 2022

(30) Foreign Application Priority Data
Apr. 3, 2019 (DE) .................... 10 2019 108 745.7

(51) Int. Cl.
*B60H 1/00* (2006.01)
*B60H 1/24* (2006.01)

(52) U.S. Cl.
CPC ......... *B60H 1/00285* (2013.01); *B60H 1/246* (2013.01); *B60H 2001/00092* (2013.01); *B60H 2001/00721* (2013.01)

(58) Field of Classification Search
CPC ................ B60H 1/00285; B60H 1/246; B60H 2001/00092; B60H 2001/00721; B60H 2001/003; B60H 1/3407; B60N 2/56
See application file for complete search history.

(56) References Cited

U.S. PATENT DOCUMENTS

| | | |
|---|---|---|
| 2,234,268 A | 3/1941 | McCollum |
| 2,301,512 A | 11/1942 | Breese |
| (Continued) | | |

FOREIGN PATENT DOCUMENTS

| | | |
|---|---|---|
| CN | 1550364 A | 12/2004 |
| CN | 1629503 A | 6/2005 |
| (Continued) | | |

OTHER PUBLICATIONS

Translation, CN-104972877-A, Oct. 2015 (Year: 2015).*
(Continued)

*Primary Examiner* — Jessica Yuen
(74) *Attorney, Agent, or Firm* — Crowell & Moring LLP

(57) ABSTRACT

An apparatus ventilates the passenger compartment of a motor vehicle. The apparatus has a source for producing an open or free jet of moving air, and a deflecting body, wherein the deflecting body is spaced apart from the source and one of the surfaces of the deflecting body is, according to the designated use, an impact face against which the open jet impinges, and the impact face is a deformable face which is integrated steplessly into a surrounding surface.

15 Claims, 3 Drawing Sheets

(56) References Cited

U.S. PATENT DOCUMENTS

| | | |
|---|---|---|
| 2,336,089 A | 12/1943 | Gould |
| 2,430,335 A | 11/1947 | Hart |
| 2,480,335 A | 8/1949 | Nordmark |
| 2,989,854 A | 6/1961 | Gould |
| 5,090,301 A | 2/1992 | Soethout |
| 6,089,971 A | 7/2000 | Jokela et al. |
| 2005/0000680 A1 | 1/2005 | Hiraishi et al. |
| 2005/0130577 A1 | 6/2005 | Butera et al. |
| 2013/0115868 A1 | 5/2013 | Davis et al. |

FOREIGN PATENT DOCUMENTS

| | | | | |
|---|---|---|---|---|
| CN | 201419629 Y | | 3/2010 | |
| CN | 104321253 A | | 1/2015 | |
| CN | 104972877 A | * | 10/2015 | ............... B60J 7/22 |
| DE | 3842676 A1 | * | 6/1990 | |
| DE | 42 29 596 A1 | | 3/1994 | |
| DE | 10 2011 119 550 A1 | | 5/2012 | |
| DE | 10 2017 209 505 A1 | | 12/2018 | |
| DE | 102017008495 A1 | * | 3/2019 | ........... A47F 3/0439 |
| EP | 0 425 721 B1 | | 4/1993 | |
| JP | 2013-95296 A | | 5/2013 | |
| JP | 2015024776 A | * | 2/2015 | |
| WO | WO 2018/224219 A1 | | 12/2018 | |

OTHER PUBLICATIONS

Translation, DE-102017008495-A1, Mar. 2019 (Year: 2019).*
Translation, DE-3842676-A1 (Year: 1990).*
Translation, JP-2015024776-A (Year: 2015).*
International Search Report (PCT/ISA/210) issued in PCT Application No. PCT/EP2020/056889 dated Jul. 24, 2020 with English translation (four (4) pages).
German-language Written Opinion (PCT/ISA/237) issued in PCT Application No. PCT/EP2020/056889 dated Jul. 24, 2020 (six (6) pages).
German-language Search Report issued in German Application No. 10 2019 108 745.7 dated Nov. 19, 2019 with a partial English translation (11 pages).
English translation of Chinese-language Office Action issued in Chinese Application No. 202080021345.9 dated May 11, 2023 (8 pages).

* cited by examiner

DEVICE FOR VENTILATING THE PASSENGER COMPARTMENT OF A MOTOR VEHICLE

BACKGROUND AND SUMMARY OF THE INVENTION

The invention relates to an apparatus for the ventilation of the passenger compartment of a motor vehicle. A typical particularly advantageous application relates to the ventilation of the region of the rear seats of a motor vehicle.

It is proposed in DE 2017 209 505 A1 for the region at the rear seats of a motor vehicle to be ventilated by a largely laminar air stream which is not delimited by way of duct walls and is called an "open jet" being blown upward approximately parallel to the backrest of the front seats from a vent nozzle which is arranged close to the floor, is equipped with a turbulence damper and is supplied with air by way of a feed duct. In intended use, the open jet impinges from the inside on the roof surface of the motor vehicle and is widened and deflected on the latter to form a slower, more divergent air stream which supplies the region at the rear seats with fresh air from above.

It is also proposed in EP 0425 721 B1 for the passenger compartment of a motor vehicle to be supplied with fresh air from above by a rapid air stream which is not delimited by way of duct walls (that is to say, likewise an open jet) being blown upward in the passenger compartment, and being widened and being deflected downward by way of impinging on the roof of the passenger compartment. The roof has an air-permeable headliner. The widening of the open jet into slower air streams takes place in the intermediate space between the headliner and the roof. The headliner has an increased air permeability on surface regions, through which air is preferably to flow.

U.S. Pat. No. 2,430,335 A also describes a method for the passenger compartment of a motor vehicle to be supplied with cold air from above. An air duct is arranged on the rear side of the backrest of a front seat, which air duct ends at the upper end of the backrest with an outlet, from which air is blown in an open jet toward the vehicle roof. A deflector body is situated on the vehicle roof, on which deflector body the open jet impinges, and which deflector body can be displaced in the vehicle longitudinal direction in a manner which is guided in a rail guide and has the form of a flat surface with a wrinkle which is oriented downward in the surface center, the profile longitudinal direction of the wrinkle running transversely with respect to the vehicle longitudinal direction. Depending on the position, into which the deflection body is displaced, the air which comes from the open jet flows, after the impingement on the deflector body, more into the front or rear or into both regions of the passenger compartment.

The object on which the invention is based consists in providing an apparatus for the ventilation of the passenger compartment of a motor vehicle, which apparatus, like the above-addressed apparatuses, has a nozzle for the outlet of an air jet as an open (free) jet, and has a deflector body which is arranged spaced apart from the nozzle and is provided to be flowed onto by way of the open jet and to change the air stream which is formed by way of the open jet, namely to deflect it and/or to divide it into a plurality of streams and/or to convert it into a wider, slower air stream. In comparison with the above-addressed apparatuses, a regulating capability which is at least equally satisfactory of the flow conditions in the air which flows away from the deflector body is to be capable of being achieved with a more advantageous visual design possibility.

In order to achieve the object, it is proposed for the deflector face, that is to say that surface of the deflector body which faces the inflowing open jet, to be configured as a deformable face which is integrated without a step into a surrounding surface.

In this way, both a highly planar impression and also flow conditions of the type which are particularly advantageous, above all, in relation to noise avoidance can be achieved satisfactorily.

In this context, "without a step" means that the deflector face merges without a step or gap into a surface which is no longer a deflector face in terms of its function.

In accordance with one embodiment of the invention, the deflector face is formed by way of surface regions of two bodies which bear against one another without a step by way of their surface regions which in each case form a part of the deflector face, and which can be displaced with respect to one another.

In accordance with one preferred embodiment of the invention, the deflector face is a surface of an elastic deformable flat body, such as, for example, a textile woven fabric or an elastomeric sheet. In this way, both step-free and gap-free designs and an extreme visual planar nature can be achieved in a highly simple way.

In accordance with a further preferred embodiment, an actuating part is arranged on that side of the elastically deformable flat body which faces away from the deflector face, which actuating part can be moved and can be fixed in different positions, and is designed to bear against the elastically deformable flat body and to elastically deform the latter.

In accordance with a further preferred embodiment, the elastically deformable flat body has ferromagnetic material portions and can be subjected to a magnetic field, by way of the action of force of which it can be deformed.

The invention will be illustrated on the basis of diagrammatic drawings in respect of exemplary apparatuses according to the invention.

DETAILED DESCRIPTION OF THE DRAWINGS

Figure 1:
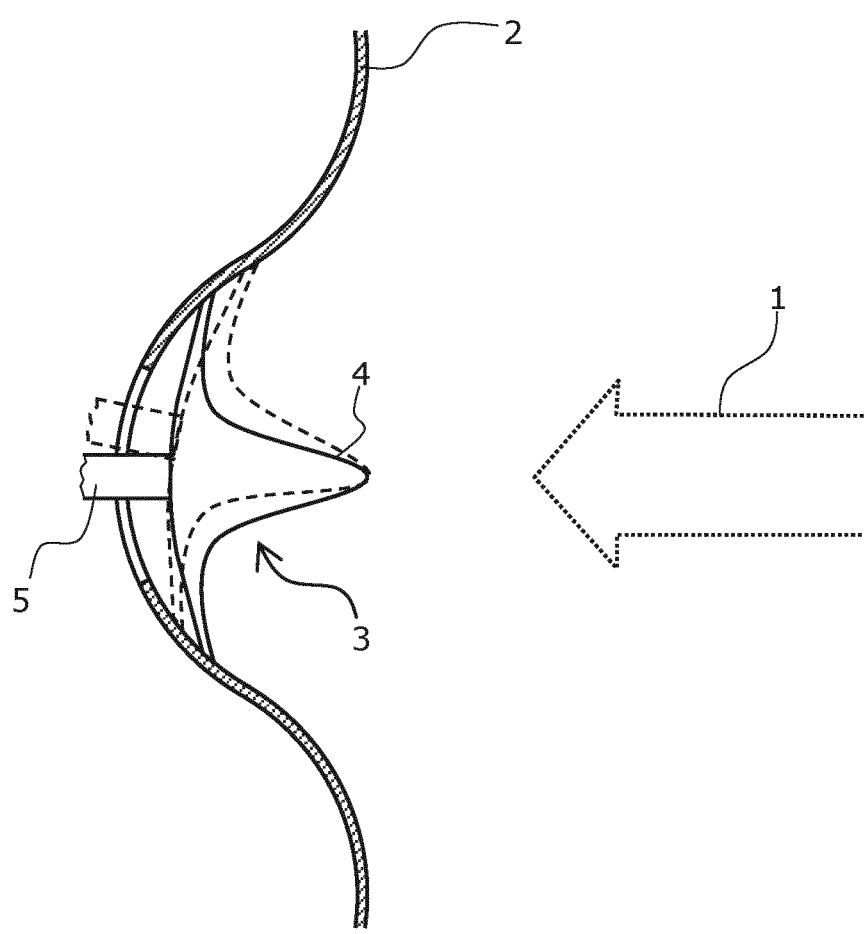
FIG. 1 shows a partial sectional view of a first embodiment of an apparatus according to the invention, the deflector body being formed by way of two part bodies which can be moved relative to one another.
Figure 2:
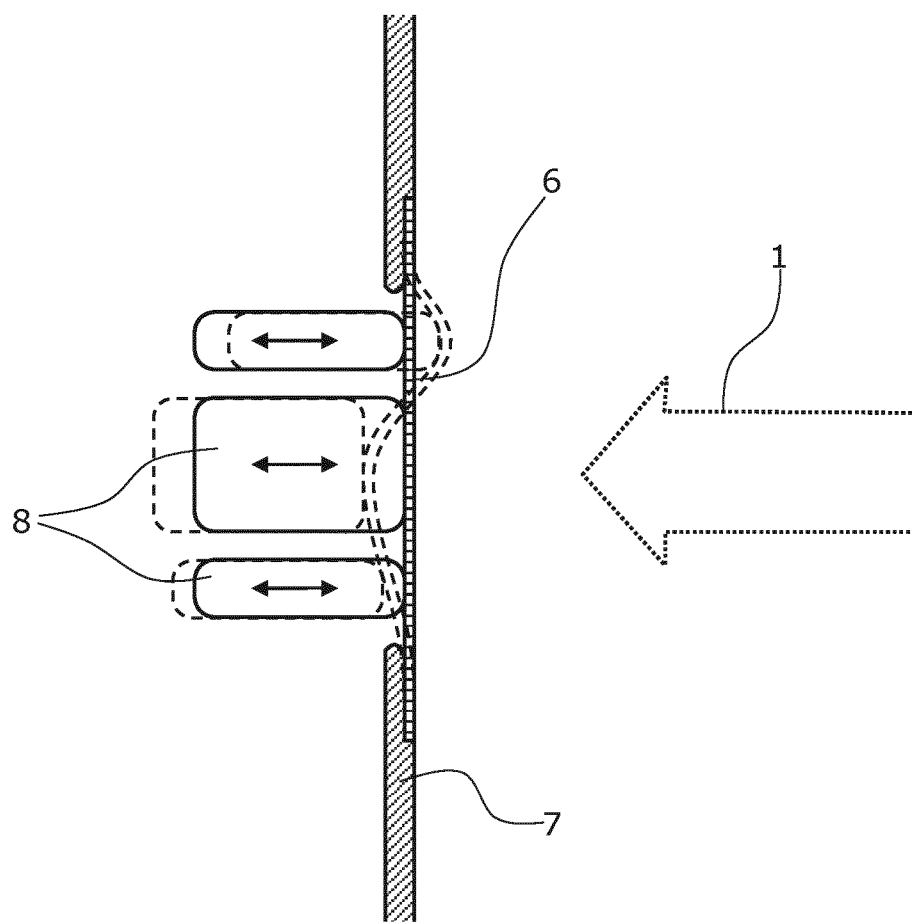
FIG. 2 shows a partial sectional view of a second embodiment of an apparatus according to the invention, the deflector body being an elastically deformable flat body, such as, for example, a textile woven fabric or an elastomeric sheet.
Figure 3:
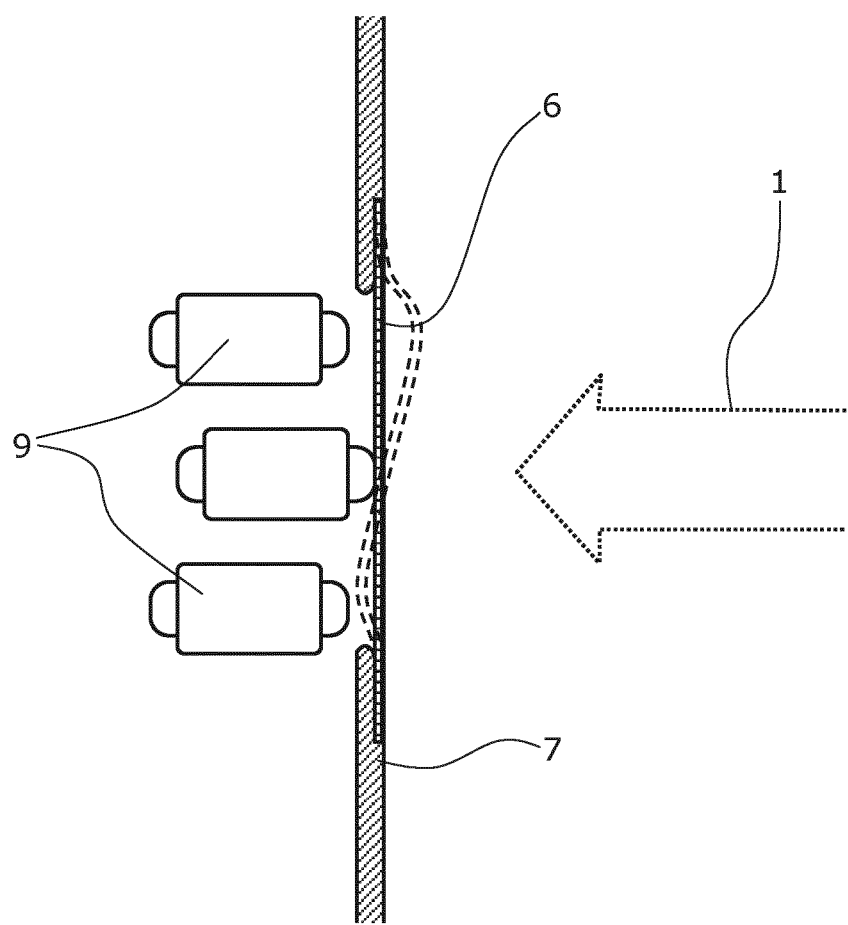
FIG. 3 shows, in an identical view to FIG. 2, a partial sectional view of a further embodiment of an apparatus according to the invention, the deflector body being an elastically deformable flat body.

In the case of all FIGS. 1-3, the deflector body is shown in each case in a neutral position and in a deflected position, the deflected position being indicated by way of dashed lines. The open jet 1 is symbolized in each case by way of an arrow which is shown using dotted lines.

The open jet is a rapid, relatively narrow, somewhat laminar air jet. The source (not shown) of the open jet 1 lies at a spacing from the respective deflector body and is typically formed by way of the outlet opening of an air-conducting duct, but can also be formed, for example, by way of a fan (blower).

According to FIG. 1, the deflector body is formed by way of two part bodies, namely a part 2, which is stationary relative to the envelope of the open jet 1, and a part 3 which can be displaced with respect to this part 2.

The stationary part 2 can be, for example, a wall of a vehicle door, a center console, a dashboard, or a roof surface trim panel. The stationary part 2 has a shell-shaped surface region, against which the displaceable part 3 bears without a step.

The displaceable part 3 has an elevation 4 which is oriented substantially away from the stationary part 2 and toward the open jet 1. In a manner which is dependent on which side of the shell-shaped surface region of the stationary part 2 the displaceable part 3 bears against, the peak or the crest of the elevation 4 lies in a different region with regard to the cross-sectional area of the open jet 1, and lies at a different angle with regard to the direction of the open jet. Accordingly, the air stream of the open jet is divided by way of the impingement of the open jet on the elevation 4 into part streams which are of different magnitude and are directed differently, and is deflected away from the deflector face again.

The elevation 4 is preferably not of rotationally symmetrical configuration, but rather is elongate like a mountain with a crest. In comparison with a rotationally symmetrical configuration, an additional degree of freedom of the setting capability of the air streams which flow away is additionally obtained in this way. The displaceable part 3 is preferably of elastomeric soft configuration at least on that edge region, at which its surface, which acts as a deflector (impact) face, adjoins that surface of the stationary part which likewise acts as a deflector face, and bears under pressure against the stationary part 2 with slight elastic prestressing.

The outlined displaceable part 3 is pulled toward the stationary part by way of a projection 5 on its side which faces away from the open jet 1. This projection 5 can also be the connection to a drive apparatus, by way of which relative movement of the displaceable part 3 with respect to the stationary part 2 can be driven. The projection 5 can also simply be an elastic tension spring, however, and relative movement of the displaceable part 3 with respect to the stationary part 2 can be driven by hand, by the displaceable part 3 simply being gripped on the elevation 4 and being displaced along the surface of the stationary part 2.

According to FIG. 2, the deflector body is an elastically deformable flat body 6, such as, for example, a textile woven fabric or an elastomeric sheet. The elastically deformable flat body 6 is arranged as a cover area above an opening in a part 7 which is stationary with regard to the envelope of the open jet 1, and is anchored, typically adhesively bonded, on the stationary part 7 with its edge regions in a flush-mounted manner.

A plurality of actuating parts 8 which can be driven for movement in the direction which is labeled by way of arrows are arranged on the side which faces away from the open jet 1. They can selectively be moved individually toward the elastically deformable flat body 6 in such a way that they press onto it and deform it, and they can be fixed in the respective positions. The drive can take place, for example, by way of electric linear motors. The elastically deformable flat body 6 can be deformed in a wide range by way of the actuating parts 8. Depending on the shape of the elastically deformable flat body 6, the open jet 1 is split and reflected in a different way on it.

In one exemplary modification with respect to the apparatus which is shown in FIG. 2, only a single actuating part 8 is used which, in contrast to the actuating parts according to FIG. 2, can be moved in more than only one degree of freedom.

It is also the case according to FIG. 3 that the deflector body is an elastically deformable flat body 6, such as, for example, a textile woven fabric or an elastomeric sheet, which is arranged as a cover area above an opening in a part 7 which is stationary with regard to the envelope of the open jet 1, and is anchored, typically adhesively bonded, on the stationary part with its edge regions in a flush-mounted manner.

In this case, the elastically deformable flat body 6 has ferromagnetic material portions, for example a mesh made from iron wires.

On the side which faces away from the open jet 1, a plurality of electromagnets 9 are arranged in the region close to the elastically deformable flat body 6, at least in each case one pole being oriented toward the elastically deformable flat body 6. The electromagnets can be selectively switched on individually, the respective polarity and the current intensity preferably also being selectable. By it being possible for the respective near region of the elastically deformable flat body 6 to be selectively attracted or repelled by way of the poles of the electromagnets, the elastically deformable flat body 6 can be deformed in a targeted manner. Depending on the shape of the elastically deformable flat body 6, the open jet 1 is split and reflected in a different way on it.

In one exemplary modification with respect to the apparatus which is shown in FIG. 3, only a single electromagnet 9 or a single permanent magnet is used, it being possible, however, for this electromagnet 9 or permanent magnet to be displaced parallel to the plane of the relaxed elastically deformable flat body 6.

What is claimed is:

1. An apparatus for ventilating a passenger compartment of a motor vehicle, comprising:
    a source for generating an open jet of moving air inside the passenger compartment; and
    a deflector body, wherein
    the deflector body is spaced apart from the source and one surface of the deflector body is, configured per its intended use, a deflector face, on which the open jet is configured to impinge so as to deflect the moving air to ventilate the passenger compartment, and
    the deflector face is configured to be deformed in use and is integrated without a step into a surrounding surface, and without a gap into a surrounding surface.

2. The apparatus according to claim 1, wherein
    the deflector body has a first part of the deflector face, which is stationary relative to
    an envelope of the open jet, and a second part of the deflector face which is displaceable with respect to the first part.

3. The apparatus according to claim 1, wherein
    the deflector body is an elastically deformable flat body.

4. He apparatus according to claim 3, wherein
    the elastically deformable flat body is a textile woven fabric or an elastomeric sheet.

5. The apparatus according to claim 3, further comprising:
    an actuating part arranged on that side of the elastically deformable flat body which faces away from the deflector face, said actuating part being movable and being fixable in different positions, said actuating part being configured to bear against the elastically deformable flat body and to elastically deform the flat body.

6. The apparatus according to claim 3, wherein
the elastically deformable flat body has a ferromagnetic material portion and is subjected to a magnetic field, by way of which the action of force deforms the flat body.
7. The apparatus according to claim 6, wherein
the magnetic field is generated by way of an electromagnet which is arranged on that side of the elastically deformable flat body which lies so as to face away from the deflector face.
8. The apparatus according to claim 1, wherein
the deflector body comprises an elevation which comprises a peak.
9. The apparatus according to claim 8, wherein
the peak is aligned with a direction of the open jet of moving air.
10. The apparatus according to claim 8, wherein
the elevation is not rotationally symmetrical.
11. The apparatus according to claim 8, wherein
the elevation comprises an elongate mountain-like shape.
12. The apparatus according to claim 1, wherein
the deflector body is part of a wall of a door of the motor vehicle.
13. The apparatus according to claim 1, wherein
the deflector body is a part of a center console of the motor vehicle.
14. The apparatus according to claim 1, wherein
the deflector body is part of a dashboard of the motor vehicle.
15. The apparatus according to claim 1, wherein
the deflector body is an interior part of a roof of the motor vehicle.

* * * * *